United States Patent
Lee et al.

(10) Patent No.: US 11,823,056 B2
(45) Date of Patent: Nov. 21, 2023

(54) METHOD FOR TRAINING NEURAL NETWORK AND DEVICE THEREOF

(71) Applicant: Lunit Inc., Seoul (KR)

(72) Inventors: HyunJae Lee, Seoul (KR); Hyo-Eun Kim, Seoul (KR); Weonsuk Lee, Seoul (KR)

(73) Assignee: LUNIT INC., Seoul (KR)

( * ) Notice: Subject to any disclaimer, the term of this patent is extended or adjusted under 35 U.S.C. 154(b) by 538 days.

(21) Appl. No.: 16/842,435

(22) Filed: Apr. 7, 2020

(65) Prior Publication Data
US 2021/0125074 A1   Apr. 29, 2021

(30) Foreign Application Priority Data

Oct. 28, 2019   (KR) .................. 10-2019-0134348

(51) Int. Cl.
*G06N 3/084*   (2023.01)
*G06N 20/20*   (2019.01)
(Continued)

(52) U.S. Cl.
CPC ............ *G06N 3/084* (2013.01); *G06N 3/045* (2023.01); *G06N 20/20* (2019.01); *G06T 5/50* (2013.01);
(Continued)

(58) Field of Classification Search
None
See application file for complete search history.

(56) References Cited

U.S. PATENT DOCUMENTS

| 10,565,707 B2 * | 2/2020 | Liu ................... G06V 10/764 |
| 2017/0193400 A1 * | 7/2017 | Bhaskar ............... G06N 3/0454 |

(Continued)

FOREIGN PATENT DOCUMENTS

| KR | 10-2017-0096298 A | 8/2017 |
| KR | 10-2018-0022288 A | 3/2018 |

(Continued)

OTHER PUBLICATIONS

Cong, Wenxiang Shan, Hongming Zhang, Xiaohua Liu, Shaohua Ning, Ruola Wang, Ge, "Deep-learning-based Breast CT for Radiation Dose Reduction", https://doi.org/10.48550/arXiv.1909.11721, Sep. 25, 2019.*

(Continued)

*Primary Examiner* — Jiangeng Sun
(74) *Attorney, Agent, or Firm* — LEX IP MEISTER, PLLC

(57) ABSTRACT

Provided is a method for training a neural network and a device thereof. The method may train a neural network with three-dimensional (3D) training image data including a plurality of two-dimensional (2D) training image data. The method may include training, at a processor, a first convolutional neural network (CNN) with the plurality of 2D training image data, wherein the first convolutional neural network comprises 2D convolutional layers. The method may further include training, at the processor, a second convolutional neural network with the 3D training image data, wherein the second convolutional neural network comprises the 2D convolutional layers and 3D convolutional layers configured to receive an output of the 2D convolutional layers as an input.

19 Claims, 15 Drawing Sheets

(51) Int. Cl.
| | |
|---|---|
| *G06T 5/50* | (2006.01) |
| *G06V 10/82* | (2022.01) |
| *G06N 3/045* | (2023.01) |
| *G06V 10/774* | (2022.01) |
| *G06V 10/44* | (2022.01) |
| *G06V 20/64* | (2022.01) |

(52) U.S. Cl.
CPC .......... *G06V 10/44* (2022.01); *G06V 10/7747* (2022.01); *G06V 10/82* (2022.01); *G06V 20/647* (2022.01); *G06T 2207/10081* (2013.01); *G06T 2207/20081* (2013.01); *G06T 2207/20084* (2013.01); *G06T 2207/20212* (2013.01); *G06T 2207/30068* (2013.01)

(56) References Cited

U.S. PATENT DOCUMENTS

| | | | |
|---|---|---|---|
| 2017/0356976 A1* | 12/2017 | Shapiro | G06K 9/6273 |
| 2019/0130562 A1* | 5/2019 | Liu | G06T 7/0012 |
| 2019/0164301 A1* | 5/2019 | Kim | G06K 9/6256 |
| 2020/0000362 A1* | 1/2020 | Wallace | G06N 3/0454 |
| 2020/0151512 A1* | 5/2020 | Corral-Soto | G06K 9/6262 |
| 2020/0211284 A1* | 7/2020 | Lin | G06T 7/12 |
| 2020/0349449 A1* | 11/2020 | Wang | G06N 3/0454 |
| 2020/0387706 A1* | 12/2020 | Zur | A61B 1/00097 |
| 2021/0287045 A1* | 9/2021 | Curtin | G16H 30/20 |
| 2021/0334944 A1* | 10/2021 | Spickermann | G01S 17/86 |
| 2022/0208355 A1* | 6/2022 | Li | G06N 3/084 |

FOREIGN PATENT DOCUMENTS

| | | | |
|---|---|---|---|
| KR | 10-2018-0108501 A | | 10/2018 |
| KR | 10-2019-0048279 A | | 5/2019 |

OTHER PUBLICATIONS

R. K. Samala, H. -P. Chan, L. Hadjiiski, M. A. Helvie, C. D. Richter and K. H. Cha, "Breast Cancer Diagnosis in Digital Breast Tomosynthesis: Effects of Training Sample Size on Multi-Stage Transfer Learning Using Deep Neural Nets," in IEEE Transactions on Medical Imaging, vol. 38, No. 3, pp. 686-696, Mar. 2019, d.*
Office Action dated Dec. 24, 2019 in Korean Application No. 10-2019-0134348, in 9 pages.
Office Action dated Feb. 17, 2020 in Korean Application No. 10-2019-0134348, in 8 pages.
Kang et al., "A deep convolutional neural network using directional wavelets for low-dose X-ray CT reconstruction," *Medical Physics*, 44(10), Oct. 2017, pp. e360-e375.
Li et al., "H-DenseUNet: Hybrid Densely Connected UNet for Liver and Tumor Segmentation from CT Volumes," *IEEE Transactions on Medical Imaging*, Jul. 3, 2018, pp. 1-13.
Sekou et al., "From Patch to Image Segmentation using Fully Convolutional Networks—Application to Retinal Images," preprint submitted to *Computerized Medical image and graphics (CMIG)*, Jun. 19, 2019, pp. 1-21.
Shan et al., "3-D Convolutional Encoder-Decoder Network for Low-Dose CT via Transfer Learning from a 2-D Trained Network," *IEEE Transactions on Medical Imaging*, vol. 37, No. 6, Jun. 2019, pp. 1522-1534.
Yosinski et al., "How transferable are features in deep neural networks?", 2014, pp. 1-9.

* cited by examiner

METHOD FOR TRAINING NEURAL NETWORK AND DEVICE THEREOF

CROSS-REFERENCE TO RELATED APPLICATIONS

This application claims the priority of Korean Patent Application No. 10-2019-0134348, filed on Oct. 28, 2019, in the Korean Intellectual Property Office, the disclosure of which is hereby incorporated by reference in its entirety.

BACKGROUND

Technical Field

The present disclosure relates to a method for training a neural network and a device thereof. In particular, the present disclosure relates to a method for training a neural network with three-dimensional (3D) images and a device to which the method is applied.

Description of Related Technology

Neural networks are machine learning models that simulate the neuron structure of a human. A neural network consists of one or more layers, and the output data of each layer is used as an input to the next layer. Recently, researches on the utilization of a deep neural network composed of a plurality of layers have been actively conducted, and the deep neural network has been playing a crucial role in enhancing the performance of recognition in various fields such as speech recognition, natural language processing, lesion diagnosis, and so on.

A deep neural network comprises a large number of hidden layers, and accordingly, can be trained with a variety of nonlinear relationships. However, training a neural network with 3D images of high resolution such as digital breast tomosynthesis (DBT) as input causes various difficulties and problems due to the amount of computation, memory usage, and the like.

Furthermore, in the case that the resolution of 3D images is reduced or a small network is used to overcome the limitations of memory, the performance of the neural network may be degraded.

SUMMARY

It is an aspect of the present disclosure to provide a method for training a neural network capable of training a neural network with 3D images.

It is another aspect of the present disclosure to provide a computer program stored in a computer-readable recording medium capable of training a neural network with 3D images.

It is yet another aspect of the present disclosure to provide a device for training a neural network capable of training a neural network with 3D images.

Aspects of the present disclosure are not limited to the list described above, and other objects that have not been mentioned will be clearly understood by a person having ordinary skill in the art from the following description.

A method is provided for training a neural network in accordance with some embodiments to achieve the objects described above, and the method for training a neural network with three-dimensional (3D) training image data comprising a plurality of two-dimensional (2D) training image data, comprises: training a first convolutional neural network (CNN) with the plurality of 2D training image data, wherein the first convolutional neural network comprises 2D convolutional layers; and training a second convolutional neural network with the 3D training image data, wherein the second convolutional neural network comprises the 2D convolutional layers and 3D convolutional layers configured to receive an output of the 2D convolutional layers as an input.

A computer program to which a method for training a neural network is applied in accordance with some embodiments to achieve another object described above executes, in combination with a computing device: a step of training a first convolutional neural network (CNN) with first patch image data included in each of a plurality of 2D training image data, wherein the first convolutional neural network comprises 2D convolutional layers, the 2D convolutional layers comprise first convolutional layers and second convolutional layers configured to receive an output of the first convolutional layers as an input, and the plurality of 2D training image data are included in 3D training image data; a step of training the first convolutional neural network with all of the plurality of 2D training image data, wherein parameters of the first convolutional layers are fixed according to a result of training the first convolutional neural network with the first patch image data; a step of training a second convolutional neural network with the 3D training image data, wherein the second convolutional neural network comprises the 2D convolutional layers and 3D convolutional layers configured to receive an output of the 2D convolutional layers as an input; and a step of fixing parameters of at least some of the 2D convolutional layers according to a training result of the first convolutional neural network.

A device for training a neural network in accordance with some embodiments to achieve yet another object described above comprises: a storage unit having a computer program stored therein; a memory unit into which the computer program is loaded; and a processing unit for executing the computer program, wherein the computer program comprises: an operation of training a first convolutional neural network (CNN) with a plurality of 2D training image data, wherein the first convolutional neural network comprises 2D convolutional layers, and the plurality of 2D training image data are included in 3D training image data; and an operation of training a second convolutional neural network with the 3D training image data, wherein the second convolutional neural network comprises the 2D convolutional layers and 3D convolutional layers configured to receive an output of the 2D convolutional layers as an input, and parameters of at least some of the 2D convolutional layers are fixed according to a training result of the first convolutional neural network.

A method is provided for training a neural network in accordance with some embodiments to achieve yet another object described above, and the method for training a neural network with three-dimensional (3D) training image data comprising a plurality of two-dimensional (2D) training image data, comprises: a spatial information learning stage for learning spatial features of the plurality of 2D training image data; and a context information learning stage for learning context information between the plurality of 2D training image data by combining the spatial features of each of the plurality of 2D training image data.

DETAILED DESCRIPTION

Figure 1:
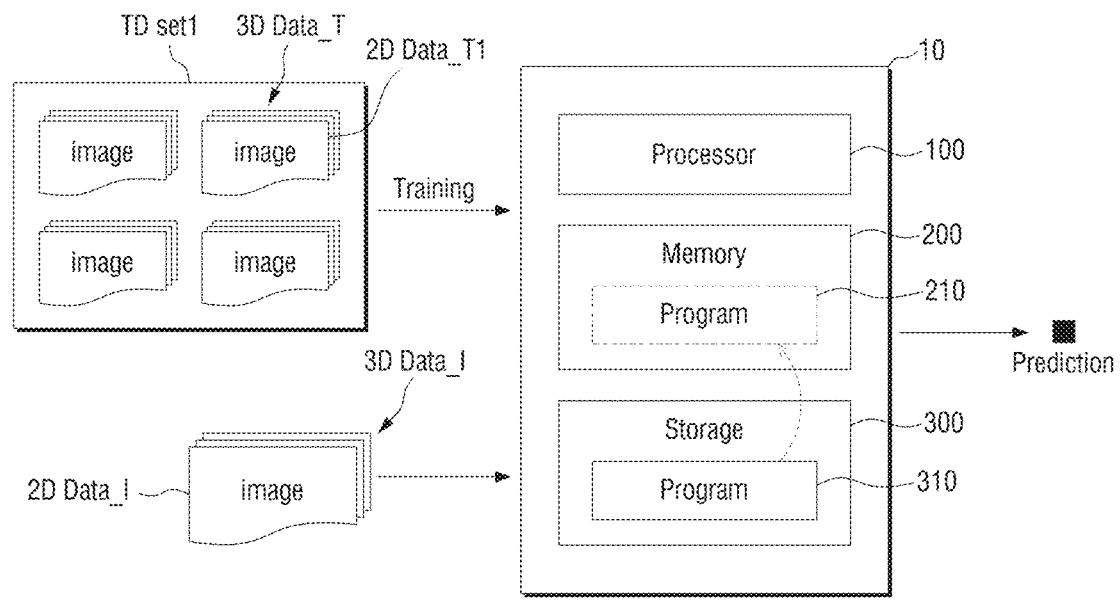
FIG. 1 is a block diagram for illustrating a device for training a neural network according to some embodiments.

The advantages and features of the disclosed embodiments and methods of achieving them will be apparent when reference is made to the embodiments described below in conjunction with the accompanying drawings. However, the present disclosure is not limited to the embodiments disclosed below but may be implemented in a variety of different forms, and the present embodiments are provided only to make the present disclosure complete and are merely provided to fully convey the scope of the invention to those having ordinary skill in the art.

Terms used herein will be briefly described, and then the disclosed embodiments will be described in detail.

Although the terms used herein have been chosen as generic terms that are widely used at present taking into account the functions of the present disclosure, they may vary depending on the intentions of those having ordinary skill in the art, or precedents, the emergence of new technology, and the like. Further, there may be terms arbitrarily selected by the applicant in some cases, and in that case, the meaning thereof will be described in detail in the following description. Therefore, the terms used in the present disclosure should be defined based on the meanings of the terms and the contents throughout the present disclosure, rather than the simple names of the terms.

A singular-expression in the present specification also encompasses a plural-expression unless clearly indicated in the context that it is singular. Likewise, plural-expressions encompass singular expressions unless clearly indicated in the context that they are plural.

When a part is said to "include" some component throughout the specification, this means that it does not exclude other components but may further include other components unless specifically stated to the contrary.

Further, as used herein, the term "unit" refers to a software or hardware component, and a "unit" performs some functions. However, a "unit" is not meant to be limited to software or hardware. A "unit" may be configured to be in an addressable storage medium and may be configured to operate one or more processors. Thus, as an example, a "unit" encompasses components such as software components, object-oriented software components, class components, and task components, processes, functions, properties, procedures, subroutines, segments of a program code, drivers, firmware, microcode, circuits, data, databases, data structures, tables, arrays, and variables. The functions provided within components and "units" may be combined into a smaller number of components and "units" or further divided into additional components and "units."

According to an embodiment of the present disclosure, a "unit" may be implemented with a processor and a memory. The term "processor" should be construed broadly to encompass general-purpose processors, central processing units (CPUs), microprocessors, digital signal processors (DSPs), controllers, microcontrollers, state machines, and the like. In some environments, a "processor" may refer to an application-specific integrated circuit (ASIC), a programmable logic device (PLD), a field-programmable gate array (FPGA), or the like. The term "processor" may also refer to a combination of processing devices such as, for example, a combination of a DSP and a microprocessor, a combination of a plurality of microprocessors, a combination of one or more microprocessors coupled with a DSP core, or a combination of any other such components.

The term "memory" should be construed broadly to encompass any electronic component capable of storing electronic information therein. The term "memory" may also refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and the like. If a processor can read and/or write information from/to memory, the memory is said to be in electronic communication with the processor. The memory integrated into a processor is in electronic communication with the processor.

In this specification, a neural network is a term encompassing all kinds of machine learning models designed to mimic neural structures. For example, the neural network may comprise all kinds of neural network based models, such as an artificial neural network (ANN), a convolutional neural network (CNN), and the like.

For convenience, the following describes a method for training a neural network and a device thereof according to some embodiments based on a convolutional neural network.

Hereinafter, embodiments will be described in greater detail with reference to the accompanying drawings so that those having ordinary skill in the art to which the present disclosure pertains may readily implement the same. Further, parts that are not relevant to the description will be left out of the drawings to describe the present disclosure clearly.

Below, a method for training a neural network and a device thereof according to some embodiments will be described with reference to FIG. 1 to FIG. 4.

FIG. 1 is a block diagram for illustrating a device for training a neural network according to some embodiments.

Referring to FIG. 1, a device 10 for training a neural network according to some embodiments may receive a first training data set TD set1. In this case, the first training data set TD set1 may comprise at least one three-dimensional (3D) training image data 3D data_T. The 3D training image data 3D data_T may comprise two-dimensional (2D) training image data 2D data_T1. A plurality of 2D training image data 2D data_T1 may constitute a 3D training image data 3D data_T. Accordingly, the plurality of 2D training image data 2D data_T1 may form the 3D training image data 3D data_T. In other words, the 3D training image data 3D data_T may be data formed by continuously arranging the 2D training image data 2D data_T1.

The device 10 for training a neural network may train the neural network therein with the first training data set TD set1. Here, the training may mean a process of determining parameters of functions in various layers existing in the neural network. The parameters may comprise weights and biases of the functions. Once the parameters are determined through training, the device 10 for training a neural network may receive 3D inference image data 3D Data_I and may perform a prediction with the parameters.

In this case, the 3D inference image data 3D Data_I may comprise a plurality of 2D inference image data 2D Data_I as with the 3D training image data 3D data_T. However, the present embodiment is not limited thereto, and 2D image data may also be received as an input for prediction.

In this case, the 3D training image data 3D data_T and the 3D inference image data 3D data_I may be at least one of a digital breast tomosynthesis (DBT) image and a computed tomography (CT) image. However, the present embodiment is not limited thereto.

The device 10 for training a neural network may perform multi-stage learning to train the neural network with the 3D training image data 3D data_T. That is, the neural network may be trained separately in a plurality of stages with the 3D training image data 3D data_T, instead of being trained all at once with the 3D training image data 3D data_T.

More specifically, the device 10 for training a neural network may train the neural network with the 3D training image data 3D data_T through a spatial information learning stage and a context information learning stage.

The spatial information learning stage may be a step of learning spatial features of the 2D training image data 2D data_T1 constituting the 3D training image data 3D data_T.

The spatial information learning stage may be further divided into several stages. Specifically, the spatial information learning stage may comprise a patch-level training stage and an image-level training stage.

The patch-level training stage may be a stage of learning the spatial features by using a patch that is part of the 2D training image data 2D data_T1 as an input. The image-level training stage may be a stage of learning the spatial features using all of the 2D training image data 2D data_T1.

The context information learning stage may be a step of combining and finally determining the spatial features in addition to learning the spatial features of the 2D training image data 2D data_T1, and may be a step of identifying context information between the respective 2D training image data 2D data_T. In this way, the 3D training image data 3D data_T may be learned through 3D convolution in the context information learning stage.

The device 10 for training a neural network may comprise a processor 100, a memory 200, and a storage 300. The processor 100 may load a computer program 310 stored in the storage 300 into the memory 200 and execute it. The processor 100 controls the overall operation of respective components of the device 10 for training a neural network. The processor 100 may comprise a central processing unit (CPU), a microprocessor unit (MPU), a microcontroller unit (MCU), a graphics processing unit (GPU), or any type of processor well known in the art. The device 10 for training a neural network may comprise one or more processors 100.

The memory 200 stores various data, commands, and/or information therein. The memory 200 may load one or more computer programs 310 from the storage 300 to execute methods/operations in accordance with various embodiments of the present disclosure. The memory 200 may be implemented with volatile memory such as random access memory (RAM), but the technical scope of the present disclosure is not limited thereto.

When the memory 200 loads the computer program 310, the processor 100 may execute operations and instructions within the computer program 310.

The storage 300 may store the computer program 310 therein. The storage 300 may store therein data for the processor 100 to load and execute. The storage 300 may comprise non-volatile memory such as, for example, read-only memory (ROM), erasable programmable ROM (EPROM), electrically erasable programmable ROM (EEPROM), flash memory, and the like, a hard disk, a removable disk, or any type of computer-readable recording medium well known in the art to which embodiments of the present invention pertain. However, the present embodiment is not limited thereto.

The computer program 310 may comprise an operation for training the device 10 for training a neural network with the first training data set TD set1 and for performing prediction corresponding to the 3D inference image data 3D Data_I.

Figure 2:
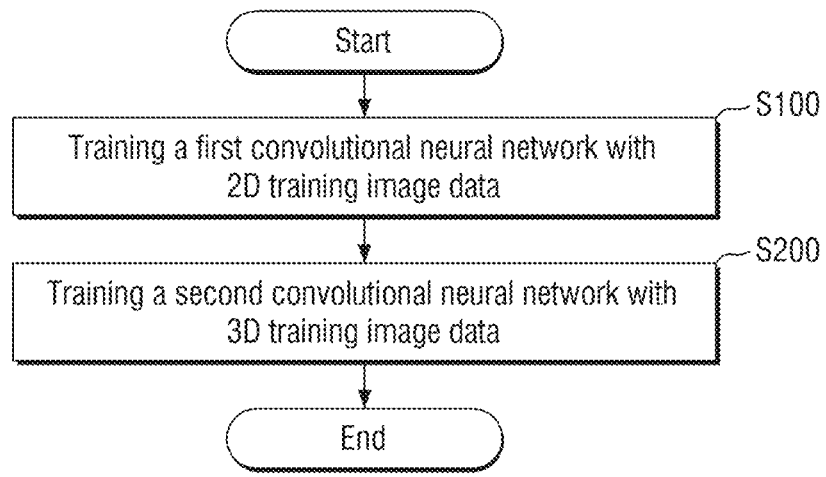
FIG. 2 is a flowchart for illustrating a method for training a neural network and a device thereof according to some embodiments.
Figure 3:
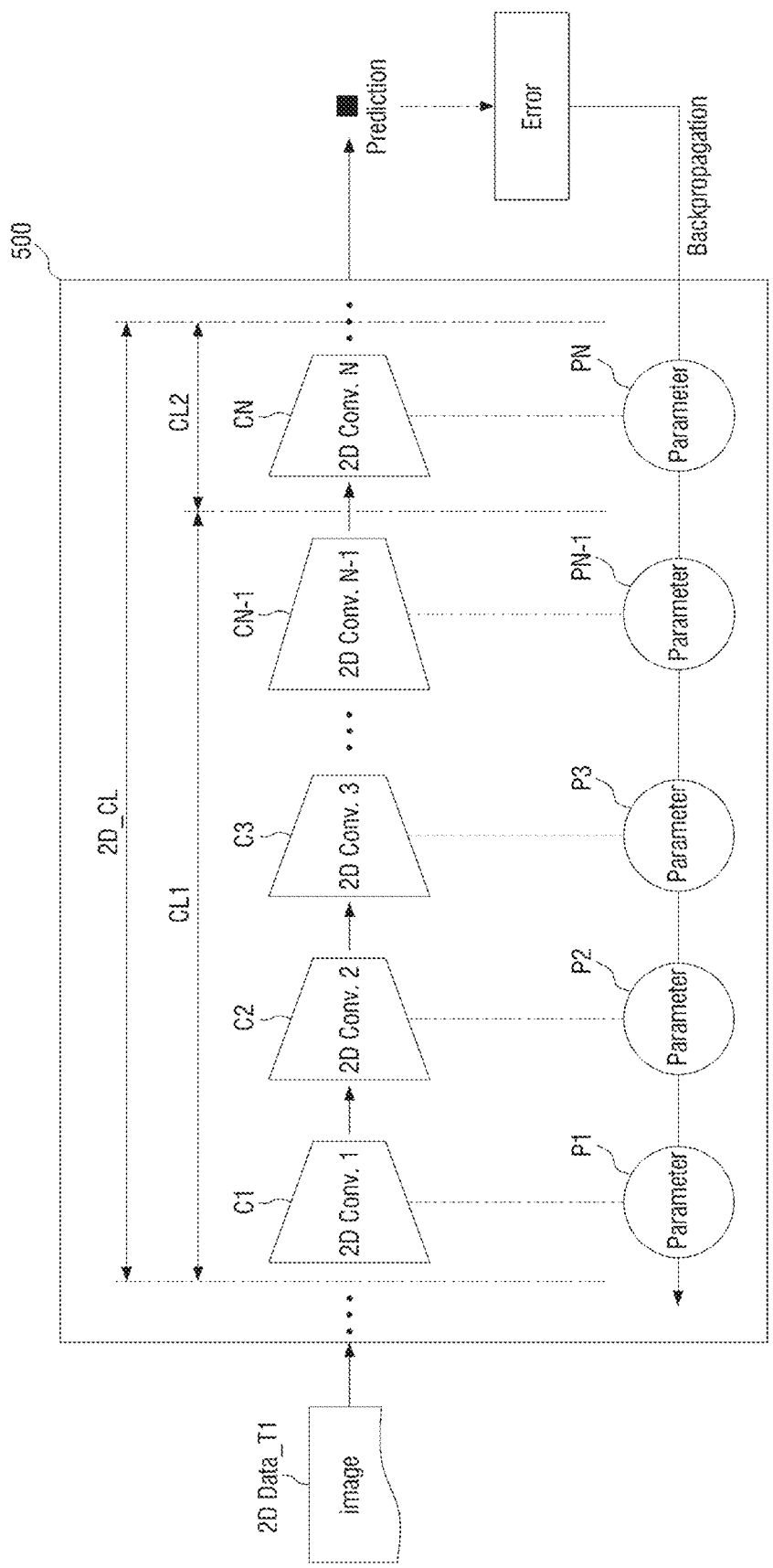
FIG. 3 is a conceptual diagram for illustrating a method for two-dimensionally training a neural network in a method for training a neural network and device thereof according to some embodiments.
Figure 4:
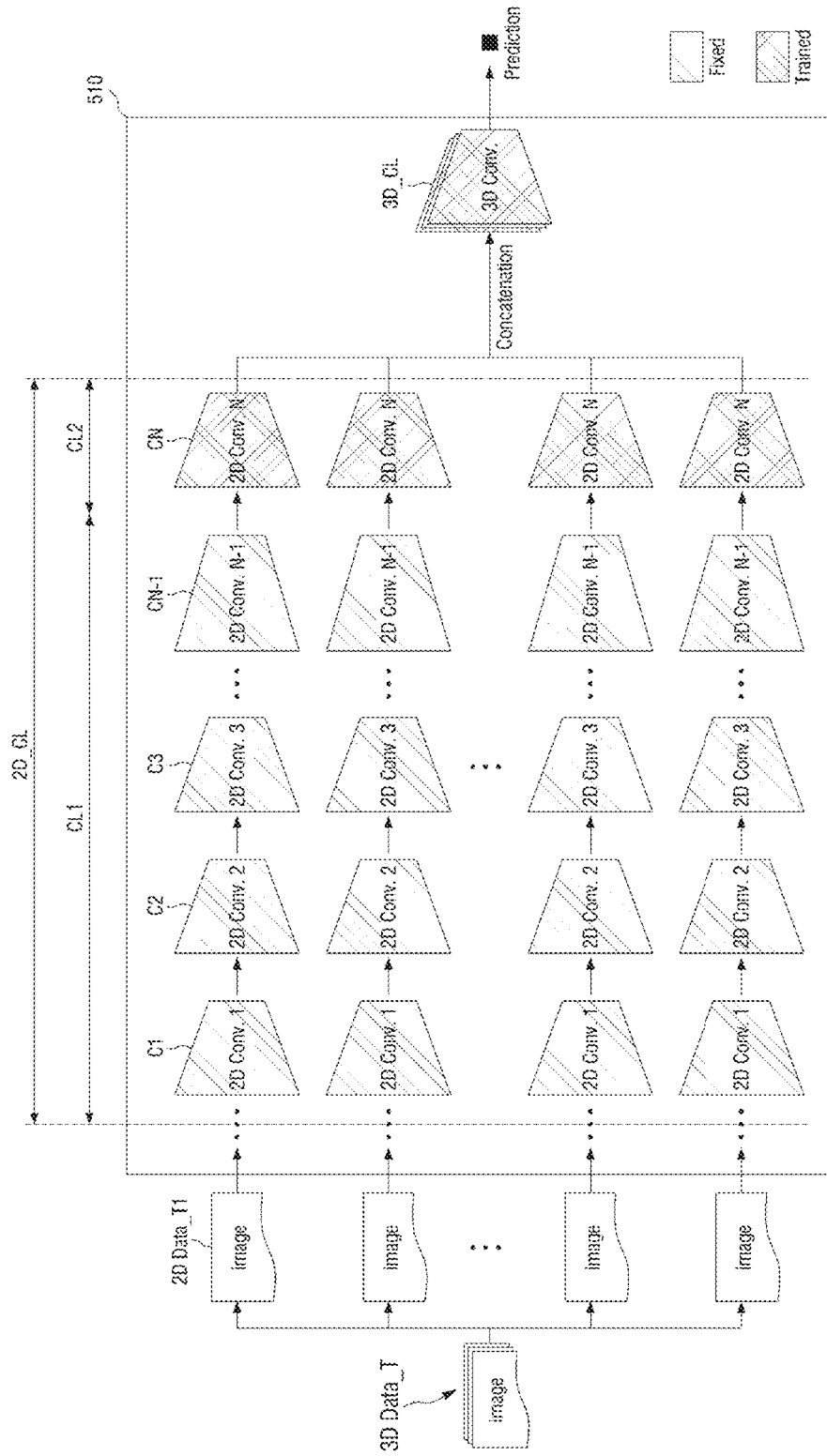
FIG. 4 is a conceptual diagram for illustrating a method for three-dimensionally training a neural network in a method for training a neural network and device thereof according to some embodiments.

FIG. 2 is a flowchart for illustrating a method for training a neural network and a device thereof according to some embodiments, FIG. 3 is a conceptual diagram for illustrating a method for two-dimensionally training a neural network in a method for training a neural network and device thereof according to some embodiments. FIG. 4 is a conceptual diagram for illustrating a method for three-dimensionally training a neural network in a method for training a neural network and device thereof according to some embodiments.

Referring to FIG. 2, a first convolutional neural network is trained using 2D image data in S100.

Specifically, referring to FIG. 1 and FIG. 3, the first convolutional neural network 500 may be a convolutional neural network (CNN) implemented with the device 10 for training a neural network according to some embodiments.

The step of training the first convolutional neural network 500 may correspond to the spatial information learning stage of the multi-stage learning described above. That is, the step S100 may be a step in which the first convolutional neural network 500 extracts feature maps of the 2D training image data 2D data_T1 constituting the 3D training image data 3D data_T, respectively, and learns spatial information thereof.

The first convolutional neural network 500 may receive the 2D training image data 2D data_T1, to thereby perform prediction. The first convolutional neural network 500 may comprise a plurality of 2D convolutional layers 2D_CL. The 2D convolutional layers 2D_CL may be layers that perform convolution on the 2D training image data 2D data_T1. Though not shown in FIG. 3, the first convolutional neural network 500 may comprise at least one of a normalization layer, an activation layer, a pooling layer, and a fully-connected layer. However, the present embodiment is not limited thereto.

The 2D convolutional layers 2D_CL may comprise N number of 2D convolutional layers C1 to CN. Here, N may be a natural number. The N number of 2D convolutional layers C1 to CN may each perform convolution with a filter. This is to extract a feature map corresponding to the filter from the 2D training image data 2D data_T1.

Each of the N number of 2D convolutional layers C1 to CN may receive the output of the previous layer as an input. In other words, the N number of 2D convolutional layers C1 to CN may perform convolution sequentially. In this case, a layer located relatively ahead of the layers may be defined as a lower layer, and a layer located relatively behind may be defined as an upper layer.

The 2D convolutional layers 2D_CL may comprise first convolutional layers CL1 and second convolutional layers CL2. The output of the first convolutional layers CL1 may be an input to the second convolutional layers CL2. That is, the first convolutional layers CL1 may be lower layers relative to the second convolutional layers CL2. The other way around, the second convolutional layers CL2 may be upper layers relative to the first convolutional layers CL1.

Though FIG. 3 shows N−1 number of first convolutional layers CL1 and one second convolutional layer CL2, this is only an example and the present embodiment is not limited thereto. In other words, the number of the first convolutional layers CL1 and the second convolutional layers CL2 may vary as desired.

The value of the prediction derived at last may be compared with the value of the training output embedded in the 2D training image data 2D data_T1 in the form of a label. An error may mean a difference between the values of the training output and the prediction. The first convolutional neural network 500 may backpropagate an error to update parameters P1 to PN of the N number of 2D convolutional layers C1 to CN. Through this process, the first convolutional neural network 500 may be trained, or may learn. In other words, once the first convolutional neural network 500 is trained on all the 2D training image data 2D data_T1, the parameters P1 to PN may be determined.

Referring to FIG. 2 again, a second convolutional neural network is trained with 3D image data in S200.

The step of training the second convolutional neural network 510 may correspond to the context information learning stage of the multi-stage learning described above. That is, the step S200 may be a step in which the second convolutional neural network 510 extracts feature maps, respectively, of the 2D training image data 2D data_T1, then concatenates the extracted feature maps with one another, and learns context information therebetween through 3D convolution.

In particular, referring to FIG. 1, FIG. 3, and FIG. 4, the second convolutional neural network 510 may be a convolutional neural network implemented with the device 10 for training a neural network according to some embodiments. The second convolutional neural network 510 may comprise a 3D convolutional layer 3D_CL, in contrast to the first convolutional neural network 500. In addition, the second convolutional neural network 510 may comprise at least one of a normalization layer, an activation layer, a pooling layer, and a fully-connected layer, as with the first convolutional neural network 500 described above. However, the present embodiment is not limited thereto.

The second convolutional neural network 510 may receive the 3D training image data 3D data_T, to thereby perform prediction. In this case, the 3D training image data 3D data_T may be divided into a plurality of 2D training image data 2D data_T1. Each of the 2D training image data 2D data_T1 passes through the N number of 2D convolutional layers C1 to CN, as with the first convolutional neural network 500, and the feature maps that are the outputs of the former may be finally concatenated with one another to form a 3D feature map. The 3D feature map may be inputted to the 3D convolutional layer 3D_CL.

In other words, each of the 2D training image data 2D data_T1 constituting the 3D training image data 3D data_T passes in parallel through the N number of 2D convolutional layers C1 to CN to produce outputs, and these outputs may be combined to be inputted to the 3D convolutional layer 3D_CL. The device 10 for training a neural network of the present embodiment may learn spatial information by the N number of 2D convolutional layers C1 to CN and may learn context information by the 3D convolutional layer 3D_CL.

However, the method of processing such 3D training image data 3D data_T may require a large amount of computation, and accordingly, the processing may not be possible if there is a limit to the capacity of the memory 200 of the device 10 for training a neural network. In particular, if the 3D training image data 3D data_T is a DBT image or a CT image of high resolution, a higher capacity of the memory 200 may be necessary.

To resolve this issue, the method for training a neural network and device thereof according to some embodiments may first train the first convolutional neural network 500 with the 2D training image data 2D data_T1, and subsequently, train the second convolutional neural network 510 with the 3D training image data 3D data_T, instead of processing the 3D training image data 3D data_T directly.

At this time, the second convolutional neural network 510 may fix the parameters of at least some of the N number of 2D convolutional layers C1 to CN using the parameters P1 to PN determined in the first convolutional neural network 500, and may be trained using only the remaining 2D convolutional layers and the 3D convolutional layer 3D_CL. For example, out of the 2D convolutional layers 2D_CL, the parameters of the first convolutional layers CL1 may be fixed, and the parameters of the second convolutional layers CL2 may be used for training.

That is, backpropagation may be performed through the value of the prediction that has passed through the 3D convolutional layer 3D_CL to update the parameters of the second convolutional layers CL2 and the 3D convolutional layers 3D_CL. In this case, the parameters of the first convolutional layers CL1 may be fixed without being updated.

The parameters of the 2D convolutional layers 2D_CL of the first convolutional neural network 500 and the 2D convolutional layers 2D_CL of the second convolutional neural network 510 may have a relatively higher similarity at lower layers. Thus, in order to overcome the limitations of the memory 200, the parameters of the lower layers of the second convolutional neural network 510 may be fixed to the corresponding parameters of the first convolutional neural network 500, and only the upper layers may be used for training to minimize the usage of the memory 200.

Though FIG. 4 illustrates that the number of lower layers whose parameters are fixed, i.e., the first convolutional layers CL1 is N−1, and the number of upper layers whose parameters are used for training, i.e., the second convolutional layers CL2 is 1, the present embodiment is not limited thereto. As the number of lower layers whose parameters are fixed increases, the usage of the memory 200 can be reduced, and thus the method for training a neural network and device thereof according to the present embodiment may appropriately select the number of lower layers whose parameters are fixed in a range that does not decrease the performance of the neural network.

In this way, the second convolutional neural network 510 may minimize the usage of the memory 200 even when processing the 3D training image data 3D data_T. Accordingly, the device 10 for training a neural network may be smoothly operated even with a low capacity of the memory 200 without decreasing performance by using 3D training image data 3D data_T of high resolution.

Hereinafter, a method for training a neural network and a device thereof according to some embodiments will be described with reference to FIGS. 1 and 5. Parts that may otherwise repeat the same description will be described briefly or omitted.

Figure 5:
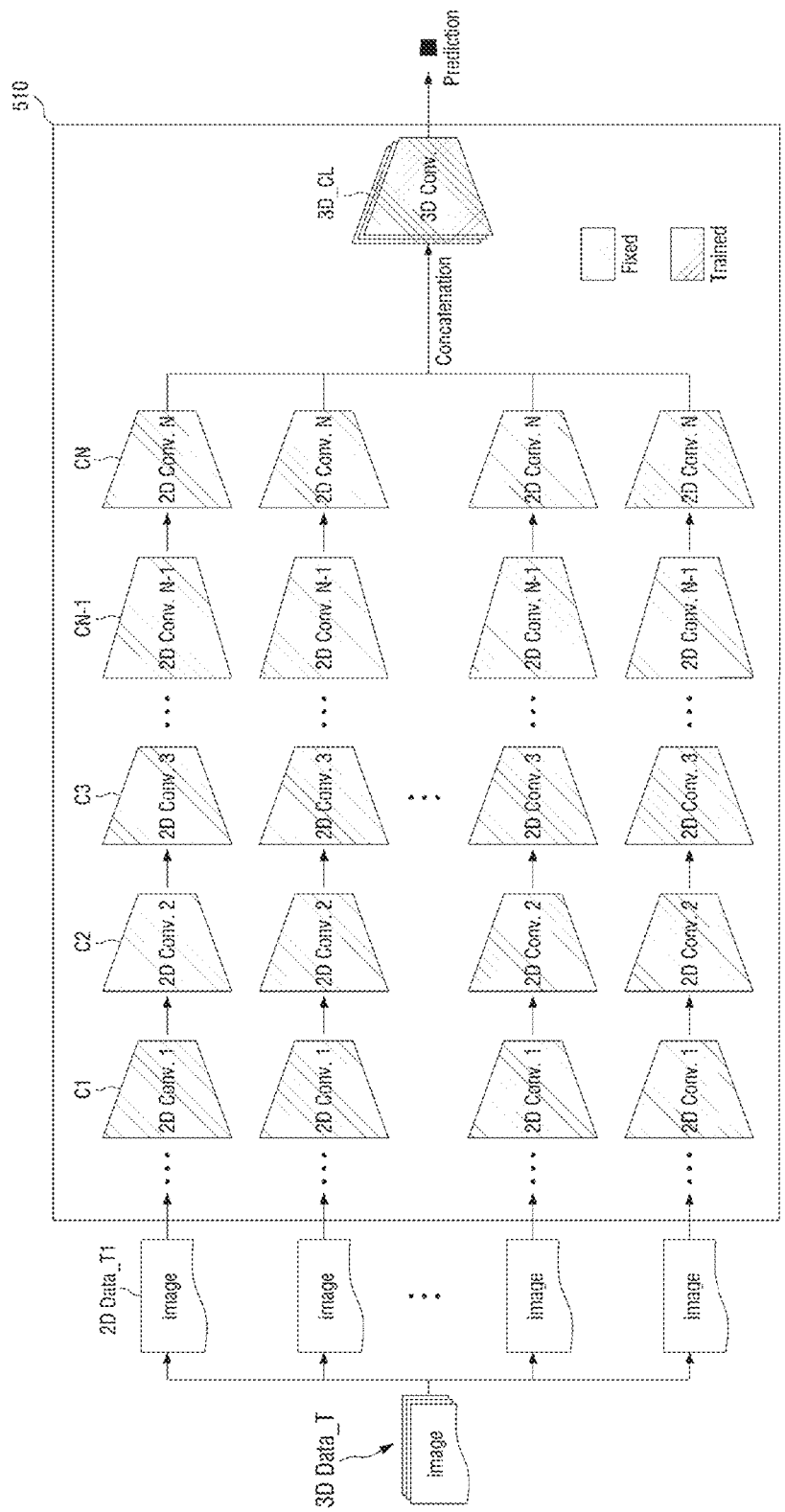
FIG. 5 is a conceptual diagram for illustrating a method for training a neural network and a device thereof according to some embodiments.

FIG. 5 is a conceptual diagram for illustrating a method for training a neural network and a device thereof according to some embodiments.

Referring to FIGS. 1 and 5, the second convolutional neural network 510 of the device for training a neural network according to some embodiments of the present disclosure may fix the parameters of all of the 2D convolutional layers 2D_CL. Accordingly, the second convolutional neural network 510 may be trained only with the parameters of the 3D convolutional layer 3D_CL.

Accordingly, the parameters determined in the first convolutional neural network 500 that was trained earlier may be used as they are as the parameters of the 2D convolutional layers 2D_CL. In this way, the memory 200 may be used concentrated on training with the parameters of the 3D convolutional layer 3D_CL. The method for training a neural network and device thereof according to the present embodiment may minimize the usage of the memory 200 as such, to thereby readily learn the 3D image data of high resolution.

Hereinafter, a method for training a neural network and a device thereof according to some embodiments will be described with reference to FIGS. 1, 2, and 6 to 9. Parts that may otherwise repeat the same description will be described briefly or omitted.

Figure 6:
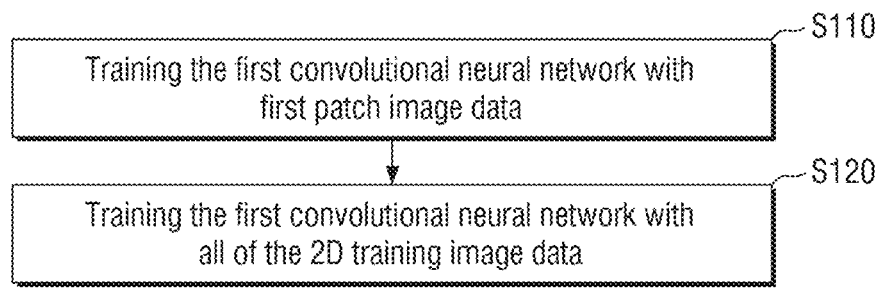
FIG. 6 is a flowchart for illustrating in detail a method for training a first convolutional neural network shown in FIG. 2.
Figure 7:
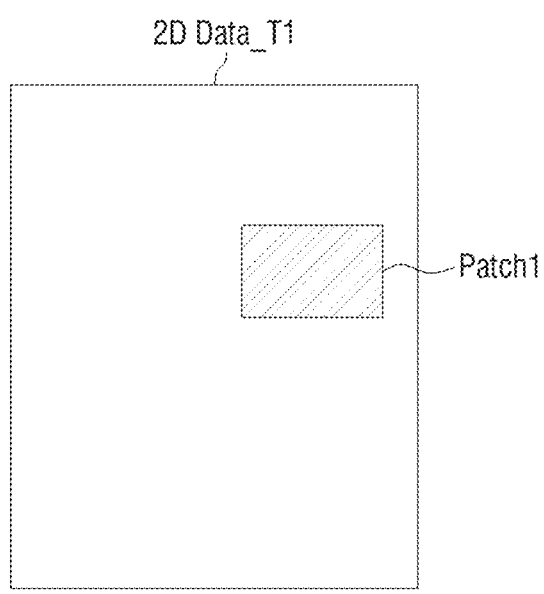
FIG. 7 is a diagram for illustrating first patch image data of 2D image data.
Figure 8:
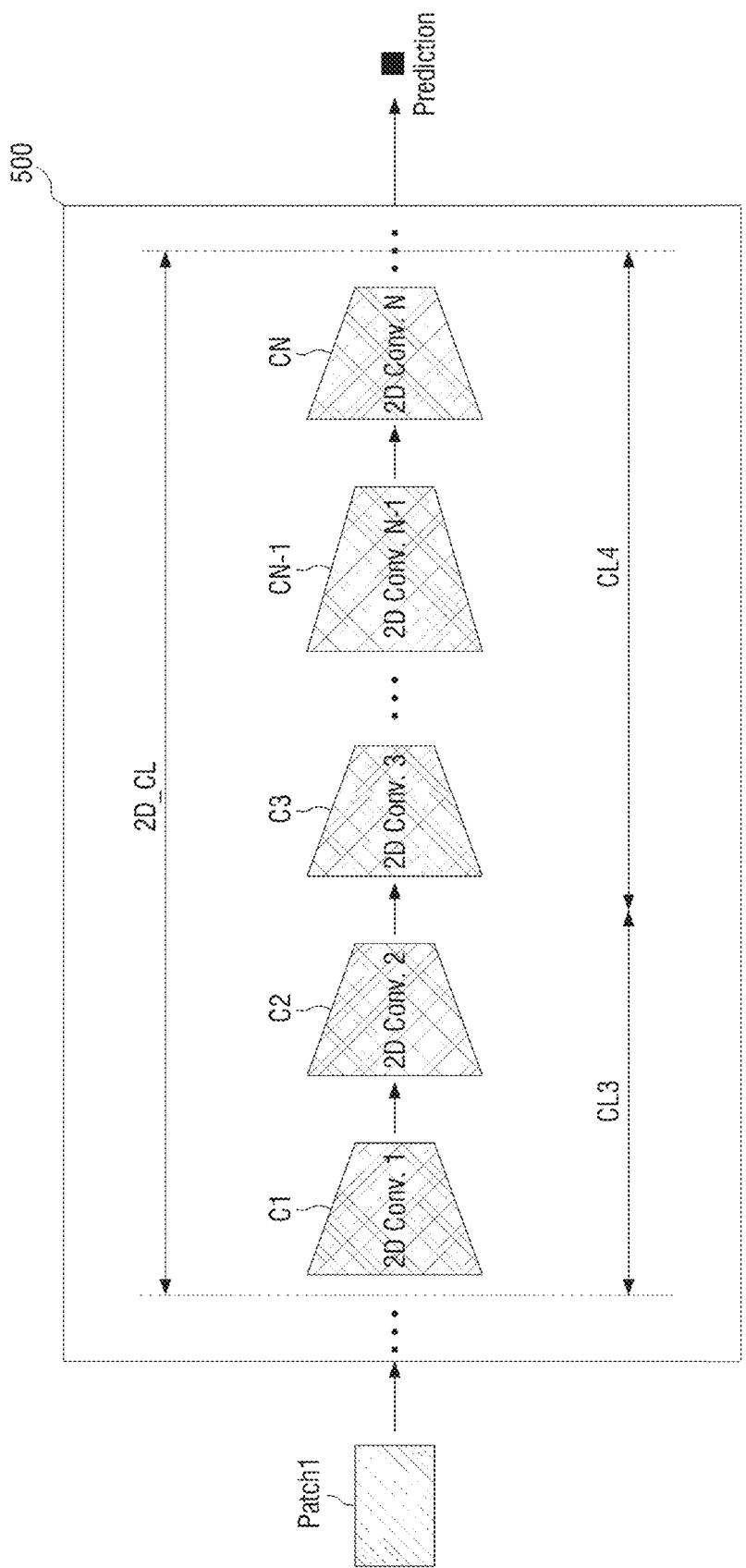
FIG. 8 is a conceptual diagram for illustrating training a first convolutional neural network with the first patch image data.
Figure 9:
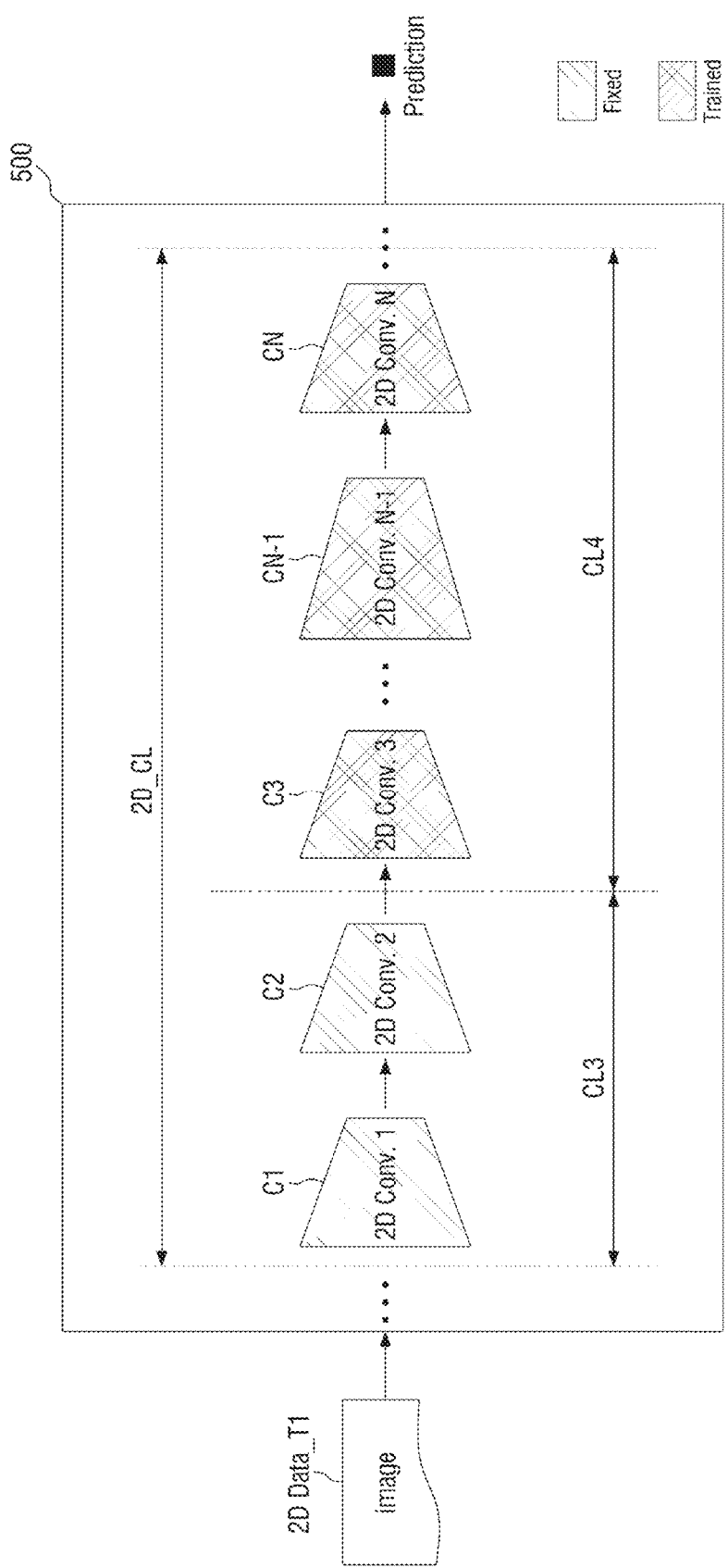
FIG. 9 is a conceptual diagram for illustrating training the first convolutional neural network with all of the 2D image data.

FIG. 6 is a flowchart for illustrating in detail a method for training the first convolutional neural network shown in FIG. 2, FIG. 7 is a diagram for illustrating first patch image data of the 2D image data. FIG. 8 is a conceptual diagram for illustrating training the first convolutional neural network with the first patch image data, FIG. 9 is a conceptual diagram for illustrating training the first convolutional neural network with all of the 2D image data;

Referring to FIGS. 2 and 6, a method for training a neural network according to some embodiments trains the first convolutional neural network with the 2D training image data in S100. In this case, the step S100 of training the first convolutional neural network may be subdivided into two steps.

First, the first convolutional neural network is trained with first patch image data in S110.

The step of training the first convolutional neural network 500 with the first patch image data Patch1 may correspond to the patch-level training stage of the spatial information learning stage described above. That is, the step S110 may be a step in which the first convolutional neural network 500 extracts feature maps of the first patch image data Patch1, respectively, and learns spatial information thereof.

Specifically, referring to FIG. 7, the first patch image data Patch1 may be included in the 2D training image data 2D data_T1. In other words, the first patch image data Patch1 may be data generated by cutting out part of the 2D training image data 2D data_T1. In this case, the first patch image data Patch1 may be generated from each of the plurality of 2D training image data 2D data_T1.

The first patch image data Patch1 may be data cut out at a random location from the 2D training image data 2D data_T1. Accordingly, the first patch image data Patch1 generated from each of the plurality of 2D training image data 2D data_T1 may be data acquired by cutting out a different location of each of the plurality of 2D training image data 2D data_T1. Of course, the present embodiment is not limited thereto. That is, the first patch image data Patch1 may be data acquired by cutting out the same location of each of the plurality of 2D training image data 2D data_T1. Sizes of the first patch image data Patch1 generated from each of the plurality of 2D training image data 2D data_T1 may be the same.

Referring to FIGS. 1 and 8, the first patch image data Patch1 may be used for training in the 2D convolutional layers 2D_CL of the first convolutional neural network 500. That is, the parameters of the 2D convolutional layers 2D_CL may be determined by prediction and backpropagation.

In this case, the 2D convolutional layers 2D_CL may comprise third convolutional layers CL3 and fourth convolutional layers CL4. The third convolutional layers CL3 may be lower layers at a lower position relative to the fourth convolutional layers CL4. In other words, the output of the third convolutional layers CL3 may be an input to the fourth convolutional layers CL4. Though FIG. 8 shows two third convolutional layers CL3 and N−2 number of fourth convolutional layers CL4, this is only an example and the present embodiment is not limited thereto. In other words, the number of the third convolutional layers CL3 and the fourth convolutional layers CL4 may vary as desired.

Since training the first convolutional neural network 500 with the first patch image data Patch1 uses smaller pixels as an input compared to the 2D training image data 2D data_T1 of high resolution, the usage of the memory 200 may be relatively small. Therefore, it may not be difficult to train the first convolutional neural network 500 with the first patch image data Patch1 even when the memory 200 is relatively small.

Referring to FIG. 6 again, the first convolutional neural network is trained with all of the 2D training image data in S120.

The step of training the first convolutional neural network 500 with all of the 2D training image data 2D data_T1 may correspond to the image-level training stage of the spatial information learning stage described above. That is, the step S120 may be a step in which the first convolutional neural network 500 extracts feature maps, respectively, of all of the 2D training image data 2D data_T1 and learns spatial information thereof.

Specifically, referring to FIG. 1 and FIG. 9, the first convolutional neural network 500 may receive all of the 2D training image data 2D data_T1, to thereby perform prediction. In the case that such 2D training image data 2D data_T1 is of high resolution as with a DBT image or a CT image, training with the 2D training image data 2D data_T1 all at once may require high usage of the memory 200.

In order to resolve this issue, the method for training a neural network and device thereof according to some embodiments may perform training with the 2D training image data 2D data_T1 in several separate stages. In other words, the first convolutional neural network 500 may be first trained with the first patch image data Patch1 that is part of the 2D training image data 2D data_T1, and subsequently, the first convolutional neural network 500 may be trained again with all of the 2D training image data 2D data_T1.

At this time, the first convolutional neural network 500 may fix the parameters of some of the lower layers using the parameters determined in the first convolutional neural network 500 that was trained with the first patch image data Patch1, and may be trained using the remaining upper layers only. For example, out of the 2D convolutional layers 2D_CL, the parameters of the third convolutional layers CL3 may be fixed, and the parameters of the fourth convolutional layers CL4 may be used for training.

The method for training a neural network and device thereof according to the present embodiments may perform backpropagation through the value of the prediction that has passed through the 2D convolutional layers 2D_CL, to update the parameters of the fourth convolutional layers CL4. At this time, the parameters of the third convolutional layers CL3 may be fixed, and only the parameters of the fourth convolutional layers CL4 may be updated.

The parameters of the 2D convolutional layers 2D_CL of the first convolutional neural network 500 trained with the first patch image data Patch1 and the 2D convolutional layers 2D_CL of the first convolutional neural network 500 trained with the 2D training image data 2D data_T1 may have a relatively higher similarity at lower layers. Thus, in order to overcome the limitations of the memory 200, the parameters of the lower layers of the first convolutional neural network 500 to be trained with the 2D training image data 2D data_T1 may be fixed to the corresponding parameters of the first convolutional neural network 500 trained with the first patch image data Patch1, and only the upper layers may be used for training to minimize the usage of the memory 200.

Though FIG. 9 shows that the number of lower layers whose parameters are fixed, i.e., the third convolutional layers CL3 is 2, and the number of upper layers whose parameter are used for training, i.e., the fourth convolutional layers CL4 is N−2, the present embodiment is not limited thereto. As the number of lower layers whose parameters are fixed increases, the usage of the memory 200 can be reduced, and thus the method for training a neural network and device thereof according to the present embodiment may appropriately select the number of lower layers whose parameters are fixed in a range that does not decrease the performance of the neural network.

In this way, the memory 200 may be minimally used even in the step of processing the 2D training image data 2D data_T1.

Again, referring to FIG. 2, the second convolutional neural network is trained using the 3D image data in S200.

Hereinafter, a method for training a neural network and a device thereof according to some embodiments will be described with reference to FIGS. 1, 2, 8, and 10 to 13. Parts that may otherwise repeat the same description will be described briefly or omitted.

Figure 10:
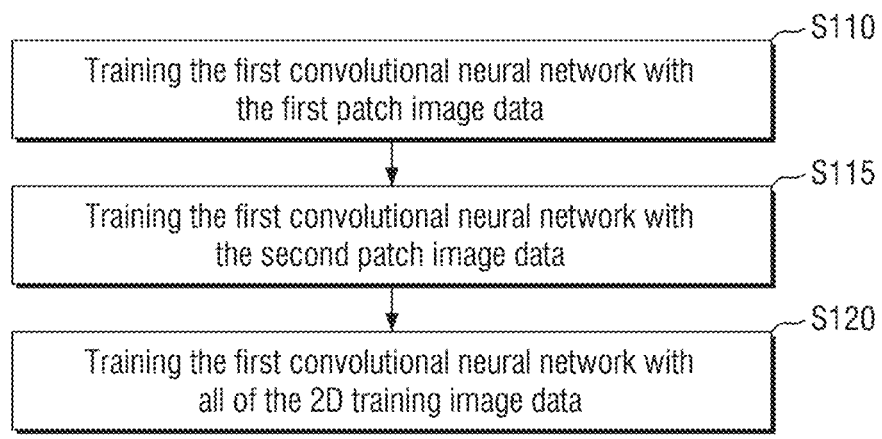
FIG. 10 is a flowchart for illustrating a method for training a neural network and a device thereof according to some embodiments.
Figure 11:
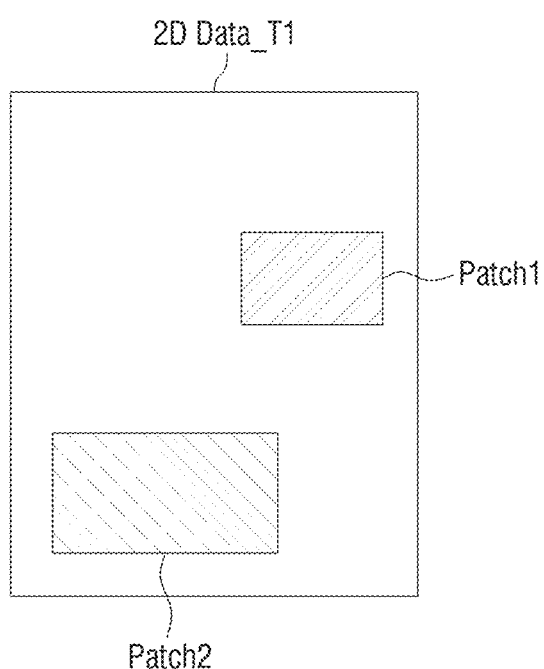
FIG. 11 is a diagram for illustrating second patch image data of the 2D image data.
Figure 12:
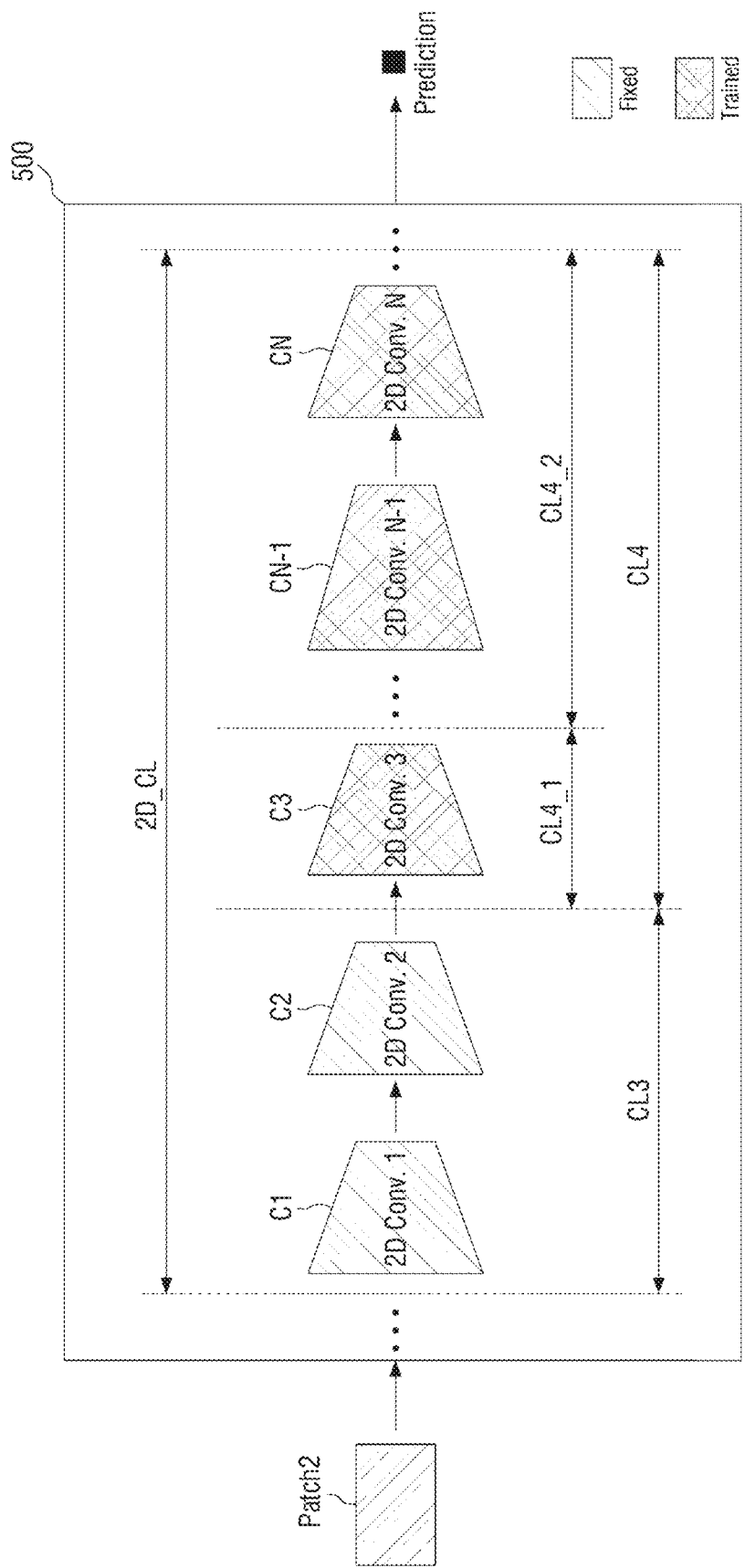
FIG. 12 is a conceptual diagram for illustrating training a first convolutional neural network with the second patch image data.
Figure 13:
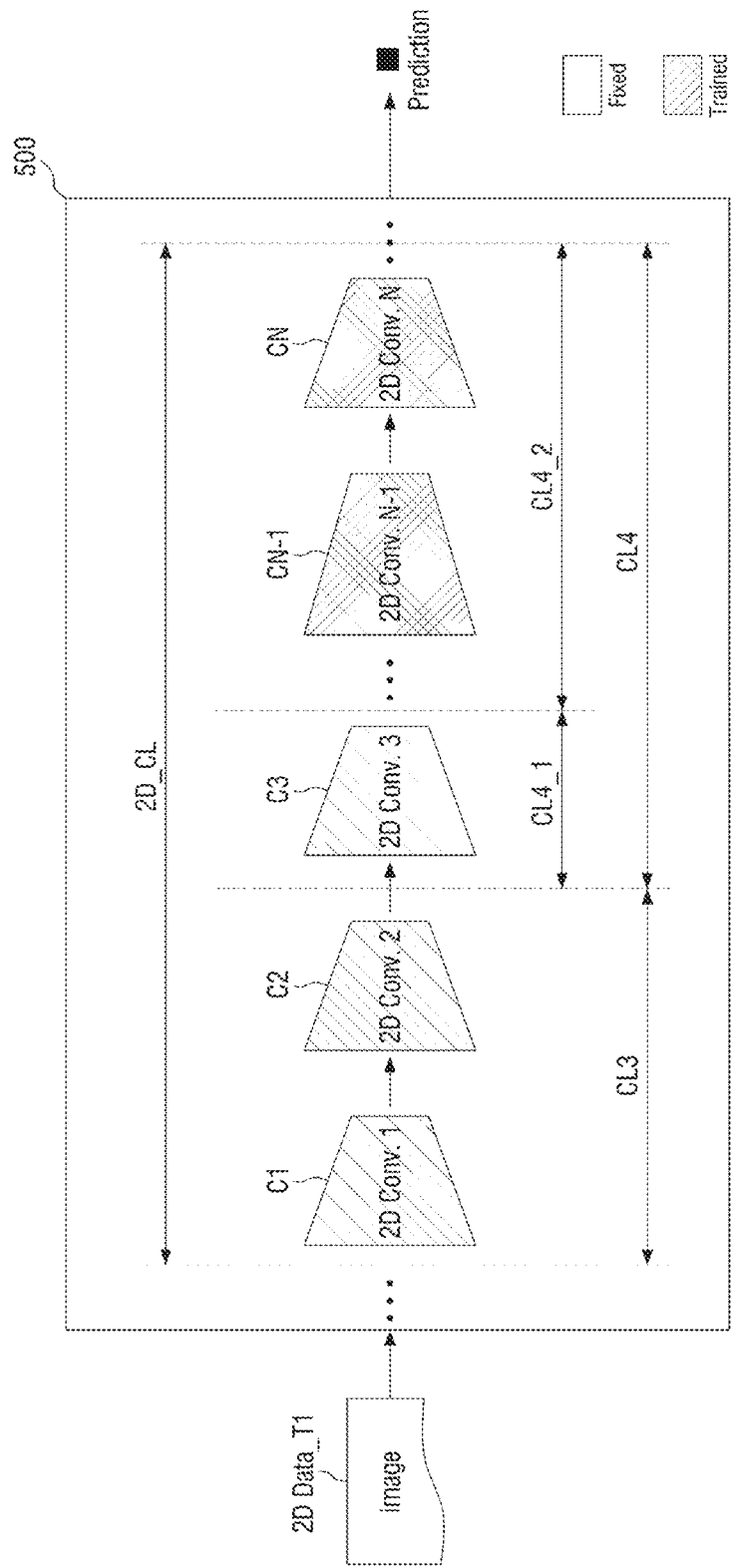
FIG. 13 is a conceptual diagram for illustrating training the first convolutional neural network with all of the 2D image data.

FIG. 10 is a flowchart for illustrating a method for training a neural network and a device thereof according to some embodiments, and FIG. 11 is a diagram for illustrating second patch image data of the 2D image data. FIG. 12 is a conceptual diagram for illustrating training the first convolutional neural network with the second patch image data, and FIG. 13 is a conceptual diagram for illustrating training the first convolutional neural network with all of the 2D image data. FIG. 10 is a diagram for illustrating in detail the steps of training the first convolutional neural network of FIG. 2.

Referring to FIGS. 2 and 10, the method for training a neural network according to some embodiments trains the first convolutional neural network with the 2D training image data in S100. In this case, the step S100 of training the first convolutional neural network may be subdivided into three steps.

First, the first convolutional neural network is trained with the first patch image data in S110. This is the same as that described in relation to FIG. 6.

Thereafter, the first convolutional neural network is trained with the second patch image data in S115.

Specifically, referring to FIG. 11, the second patch image data Patch2 may be included in the 2D training image data 2D data_T1. In other words, the second patch image data Patch2 may be data generated by cutting out part of the 2D training image data 2D data_T1. In this case, the second patch image data Patch2 may be generated from each of the plurality of 2D training image data 2D data_T1.

The second patch image data Patch2 may be data cut out at a random location from the 2D training image data 2D data_T1. Accordingly, the second patch image data Patch2 generated from each of the plurality of 2D training image data 2D data_T1 may be data obtained by cutting out a different location of each of the plurality of 2D training image data 2D data_T1. Of course, the present embodiment is not limited thereto. That is, the second patch image data Patch2 may be data obtained by cutting out the same location of each of the plurality of 2D training image data 2D data_T1. Sizes of the second patch image data Patch2 generated from each of the plurality of 2D training image data 2D data_T1 may be the same.

The size of the second patch image data Patch2 may be larger than that of the first patch image data Patch1. Since the second patch image data Patch2 may be data cut out at a random location of the 2D training image data 2D data_T1 as with the first patch image data Patch1, the second patch image data Patch2 may or may not overlap the first patch image data Patch1.

Referring to FIG. 12, the second patch image data Patch2 may be used for training in the 2D convolutional layers 2D_CL of the first convolutional neural network 500. That is, the parameters of the 2D convolutional layer 2D_CL may be determined by prediction and backpropagation.

The 2D convolutional layers 2D_CL may comprise third convolutional layers CL3 and fourth convolutional layers CL4. The third convolutional layers CL3 may be lower layers to the fourth convolutional layers CIA, and the fourth convolutional layers CL4 may be upper layers to the third convolutional layers CL3.

The fourth convolutional layers CL4 may comprise a 4_1 convolutional layer CL4_1 and 4_2 convolutional layers CL4_2. The 4_1 convolutional layer CL4_1 may be a lower layer to the 4_2 convolutional layers CL4_2, and the 4_2 convolutional layers CL4_2 may be upper layers to the 4_1 convolutional layer CL4_1. Though FIG. 12 shows one 4_1 convolutional layer CL4_1 and N−3 number of 4_2 convolutional layers CL4_2, this is only an example and the present embodiment is not limited thereto.

In this case, the first convolutional neural network 500 may fix the parameters of some of the lower layers using the parameters determined in the first convolutional neural network 500 that was trained with the first patch image data Patch1, and may be trained using the remaining upper layers only. For example, out of the 2D convolutional layers 2D_CL, the parameters of the third convolutional layers CL3 may be fixed, and the parameters of the fourth convolutional layers CL4 may be used for training.

That is, backpropagation may be performed through the value of the prediction that has passed through the 2D convolutional layers 2D_CL, to update the parameters of the fourth convolutional layers CL4. At this time, the parameters of the third convolutional layers CL3 may be fixed, and only the parameters of the fourth convolutional layers CL4 may be updated.

The parameters of the 2D convolutional layers 2D_CL of the first convolutional neural network 500 trained with the first patch image data Patch1 and the 2D convolutional layers 2D_CL of the first convolutional neural network 500 trained with the second patch image data Patch2 may have a relatively higher similarity at lower layers. Therefore, in order to overcome the limitations of the memory 200, the parameters of the lower layers of the first convolutional neural network 500 to be trained with the second patch image data Patch2 may be fixed to the corresponding parameters of the first convolutional neural network 500 trained with the first patch image data Patch1, and only the upper layers may be used for training to minimize the usage of the memory 200.

In other words, since training the first convolutional neural network 500 with the second patch image data Patch2 uses smaller pixels as an input compared to the 2D training image data 2D data_T1 of high resolution, the usage of the memory 200 may be relatively small. Furthermore, as the parameters of the lower layers may be fixed as a result of training with the first patch image data Patch1, the usage of the memory 200 may be smaller even compared to training the first convolutional neural network 500 with all of the second patch image data Patch2.

Referring to FIG. 10 again, the first convolutional neural network is trained with all of the 2D training image data in S120.

Specifically, referring to FIG. 13, the first convolutional neural network 500 may use the parameters determined in the first convolutional neural network 500 that was trained with the first patch image data Patch1 and the second patch image data Patch2 to fix the parameters of some of the lower layers, and may be trained using only the remaining upper layers. For example, the parameters of the third convolutional layers CL3 and the 4_1 convolutional layer CL4_1 out of the 2D convolutional layers 2D_CL may be fixed, and the parameters of the 4_2 convolutional layers CL4_2 may be used for training.

The method for training a neural network and device thereof according to the present embodiments may perform backpropagation through the value of the prediction that has passed through the 2D convolutional layers 2D_CL, to update the parameters of the 4_2 convolutional layers CL4_2. At this time, the parameters of the third convolutional layers CL3 and the 4_1 convolutional layer CL4_1 may be fixed, and only the parameters of the 4_2 convolutional layers CL4_2 may be updated.

Though FIG. 13 shows that the number of lower layers whose parameters are fixed, i.e., the third convolutional layers CL3 and the 4_1 convolutional layer CL4_1 is 3 in total, and the number of upper layers whose parameter are used for training, i.e., the 4_2 convolutional layers CL4_2 is N−3, the present embodiment is not limited thereto. As the number of lower layers whose parameters are fixed increases, the usage of the memory 200 can be reduced, and thus the method for training a neural network and device thereof according to the present embodiment may appropriately select the number of lower layers whose parameters are fixed in a range that does not lower the performance of the neural network.

In this way, the memory 200 may be minimally used even in the step of processing the 2D training image data 2D data_T1.

Though the present embodiment describes processing the 2D training image data 2D data_T1 through a total of three steps by using a total of two sets of patch image data, there may be more than three steps of using the patch image data as necessary. In other words, the more the number of steps, the less the usage of the memory 200, and thus the method for training a neural network and device thereof according to the present embodiment may select an appropriate number of steps.

Referring to FIG. 2 again, the second convolutional neural network is trained using the 3D image data in S200.

Hereinafter, a method for training a neural network and a device thereof according to some embodiments will be described with reference to FIGS. 14 and 15. Parts that may otherwise repeat the same description will be described briefly or omitted.

Figure 14:
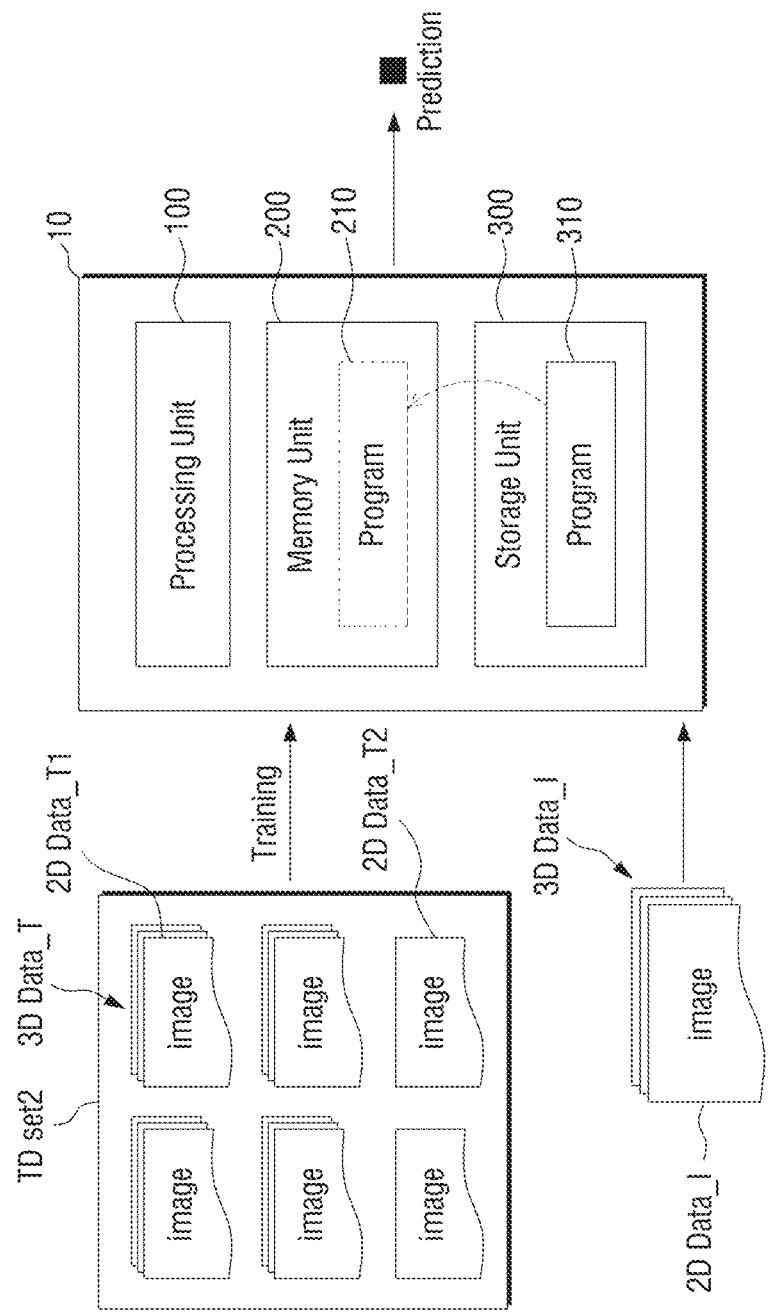
FIG. 14 is a block diagram for illustrating a method for training a neural network and a device thereof according to some embodiments.
Figure 15:
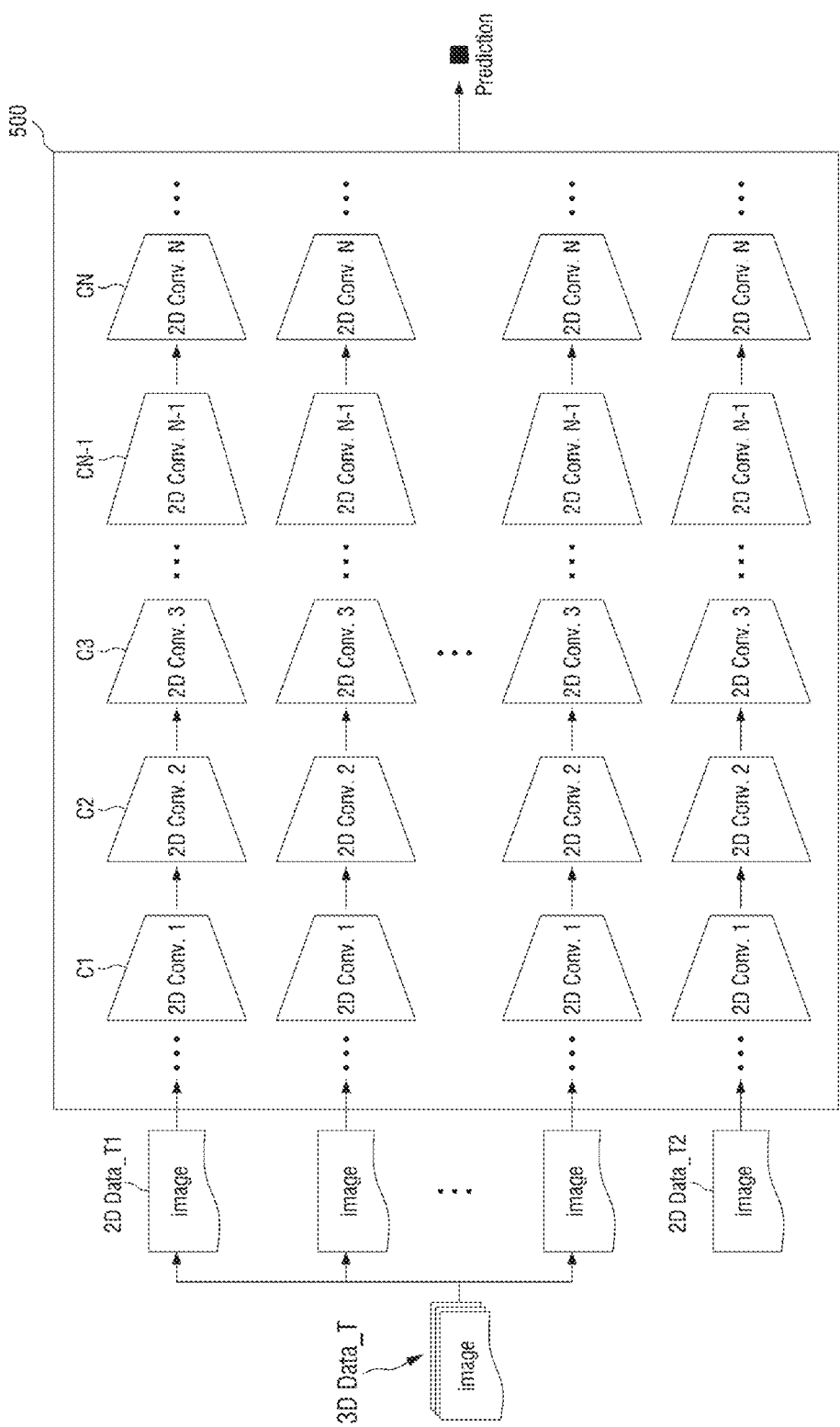
FIG. 15 is a conceptual diagram for illustrating a method for two-dimensionally training the neural network in the method for training a neural network and device thereof shown in FIG. 14.

FIG. 14 is a block diagram for illustrating a method for training a neural network and a device thereof according to some embodiments, and FIG. 15 is a conceptual diagram for illustrating a method for two-dimensionally training the neural network in the method for training a neural network and device thereof shown in FIG. 14.

Referring to FIG. 14, the device 10 for training a neural network according to some embodiments may receive a second training data set TD set2. The second training data set TD set2 may comprise at least one 3D training image data 3D data_T, and additional 2D training image data 2D data_T2. The 3D training image data 3D data_T may comprise 2D training image data 2D data_T1.

In this case, the 3D training image data 3D data_T and the additional 2D training image data 2D data_T2 may be data of different domains. Here, the domain may mean a type of data. For example, image data of different capturing methods may be data of different domains. However, the 3D training image data 3D data_T and the additional 2D training image data 2D data_T2 may be data of a somewhat high degree of similarity so as to be used together for training even if they may be of different domains.

For example, the 3D training image data 3D data_T and the 2D training image data 2D data_T1 may be data captured by a digital breast tomosynthesis (DBT) method. In this case, the additional 2D training image data 2D data_2 may be data captured by a full-field digital mammography (FFDM) method.

Moreover, the 3D training image data 3D data_T and the 2D training image data 2D data_T1 may be computed tomography (CT) image data. In this case, the additional 2D training image data 2D data_T2 may be X-ray image data.

As a matter of fact, in this case, the CT image data and the X-ray image data may be data acquired by capturing the same region. For example, if the 3D training image data 3D data_T and the 2D training image data 2D data_T1 are chest CT images, then the additional 2D training image data 2D data_T2 may be a chest X-ray image.

Referring to FIG. 15, the method for training a neural network and device thereof according to some embodiments may train the first convolutional neural network 500 by using the 2D training image data 2D data_T1 as well as the additional 2D training image data 2D data_T2 in the course of training the first convolutional neural network 500.

In the case of neural networks, a large amount and a variety of types of data to be used for training can provide better performance. The method for training a neural network and device thereof according to some embodiments can further improve the performance of the neural network by using data of different domains for training. Furthermore, the method for training a neural network and device thereof according to some embodiments can improve the performance of the neural network since the amount of data used for training increases by the amount of additional 2D training image data 2D data_T2.

Though only two domains have been described in the embodiment above, this is only an example and as a matter of fact, the number of domains in the present embodiment may be three or more.

Hereinafter, a method for training a neural network and a device thereof according to some embodiments will be described with reference to FIGS. 1 to 4 and 16. Parts that may otherwise repeat the same description will be described briefly or omitted.

Figure 16:
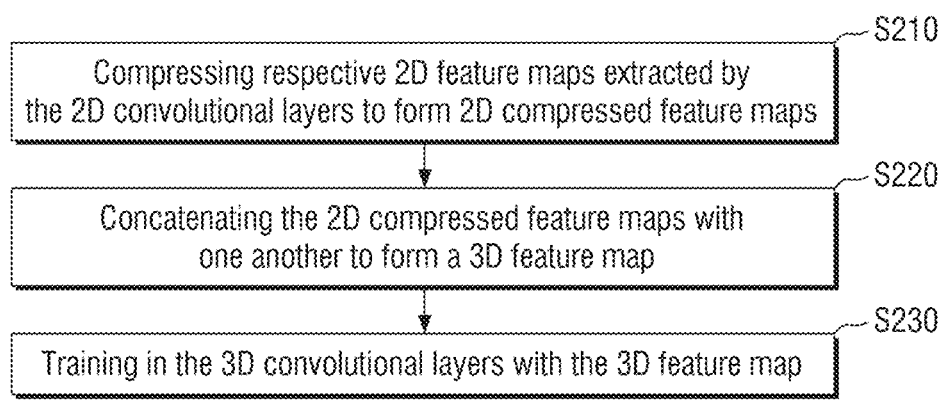
FIG. 16 is a flowchart for illustrating a method for training a neural network and a device thereof according to some embodiments.

FIG. 16 is a flowchart for illustrating a method for training a neural network and a device thereof according to some embodiments. FIG. 16 is a diagram for illustrating in detail the steps of training the second convolutional neural network shown in FIG. 2.

Referring to FIGS. 2 and 16, the method for training a neural network according to some embodiments trains the first convolutional neural network with the 2D training image data in S100.

Thereafter, the second convolutional neural network is trained with the 3D image data in S200. At this time, the step S200 of training the second convolutional neural network may be subdivided into three steps.

First, respective 2D feature maps extracted by the 2D convolutional layers are compressed to form 2D compressed feature maps in S210.

Referring to FIG. 4 in particular, the 2D feature maps that are the output derived from the plurality of 2D training image data 2D data_T1 by passing through the 2D convolutional layers 2D_CL are respectively compressed. In this case, the compression method for the 2D feature maps may vary. For example, the second convolutional neural network 510 may be used to perform convolution in a 1×1 unit or a unit of different sizes, to thereby compress the 2D feature maps. However, the present embodiment is not limited thereto.

Referring to FIG. 16 again, the 2D compressed feature maps are concatenated with one another to form a 3D feature map in S220.

The 2D compressed feature maps may be concatenated in the order of the 2D training image data 2D data_T1 from which the respective 2D compressed feature maps are derived. In this way, the 3D convolutional layer 3D_CL may be used to learn context information.

Thereafter, the 3D convolutional layer is trained with the 3D feature map in S230.

Referring to FIG. 1 and FIG. 4 in particular, if the 3D convolutional layer 3D_CL is used for training with the 3D feature map formed by concatenating uncompressed 2D feature maps with one another as they are, the usage of the memory 200 and a computational amount may be very high. Accordingly, the size of the 3D feature map can be reduced by compressing each of the 2D feature maps.

The method for training a neural network and device thereof according to the present embodiment can compress each of the 2D feature maps to form a 3D feature map of relatively small size, so as to reduce the usage of the memory 200 and the amount of computation, to thereby improve the performance of the neural network.

Although embodiments of the present invention have been described above with reference to the accompanying drawings, it will be understood by those having ordinary skill in the art to which the present invention pertains that the present invention can be implemented in other specific forms without changing the technical spirit or essential features thereof. Therefore, it should be understood that the embodiments described above are not restrictive.

What is claimed is:

1. A method for training a neural network with three-dimensional (3D) training image data comprising a plurality of two-dimensional (2D) training image data, the method comprising:

training, at a processor, a first convolutional neural network with the plurality of 2D training image data, wherein the first convolutional neural network comprises a plurality of 2D convolutional layers; and training, at the processor, a second convolutional neural network with the 3D training image data, wherein the second convolutional neural network comprises the 2D convolutional layers, and one or more 3D convolutional layers following an output of the 2D convolutional layers as an input, wherein at least one of the training the first convolutional neural network or the training the second convolutional neural network comprises training the first convolutional neural network with the plurality of 2D training image data and additional 2D training image data of a different domain from the plurality of 2training image data, wherein the 3D training image data comprises at least one of a digital breast tomosynthesis (DBT) image or a computed tomography (CT) image, and the additional 2D training image data comprises at least onf of a full-field digital mammography (FFDM) image or an X-ray image, and wherein parameters of one or more 2D convolutional layers among the 2D convolutional layers are fixed during the training of the second convolutional neural network, and parameters of one or more remaining 2D convolution layers among the 2D convolutional layers are trained with the 3D training image data during the training of the second convolutional neural network.

2. The method of claim 1, wherein parameters of the one or more 3D convolutional layers are trained with the 3D training image data during the training of the second convolutional neural network.

3. The method of claim 2, wherein each of the plurality of 2D training image data comprises first patch image data, and wherein the 2D convolutional layers comprise third convolutional layers and fourth convolutional layers configured to receive an output of the third convolutional layers as an input, and wherein the training of the first convolutional neural network comprises:

training the first convolutional neural network with the first patch image data; and training the first convolutional neural network with all of the plurality of 2D training image data, while fixing parameters of the third convolutional layers according to a result of training the first convolutional neural network with the first patch image data.

4. The method of claim 3, wherein the first patch image data are all of the same size in the plurality of 2D training image data.

5. The method of claim 3, wherein the location of the first patch image data is arbitrarily determined for each of the plurality of 2D training image data.

6. The method of claim 3, wherein each of the plurality of 2D training image data comprises second patch image data, wherein the size of the second patch image data is larger than the size of the first patch image data, and wherein the fourth convolutional layers comprise a first set of convolutional layers and a second set of convolutional layers configured to receive an output of the first set of convolutional layers as an input, wherein the method further comprises training the first convolutional neural network with the second patch image data, after training the first convolutional neural network with the first patch image data, and wherein training the first convolutional neural network with all of the plurality of 2D training image data comprises:

fixing parameters of the first set of convolutional layers according to a result of training the first convolutional neural network with the second patch image data.

7. The method of claim 2, wherein the training of the second convolutional neural network comprises:

concatenating respective 2D feature maps with one another extracted by the 2D convolutional layers from the plurality of 2D training image data to form a 3D feature map; and using the 3D feature map for training the 3D convolutional layers.

8. The method of claim 7, wherein the concatenating of the respective 2D feature maps with one another comprises compressing and concatenating the respective 2D feature maps with one another.

9. The method of claim 7, wherein compressing the respective 2D feature maps comprises compressing the respective 2D feature maps through convolution by the first convolutional neural network.

10. The method of claim 1, wherein when the 3D training image data comprises the DBT image, the additional 2D training image data comprises the FFDM image.

11. The method of claim 1, wherein when the 3D training image data comprises the CT image, the additional 2D training image data comprises the X-ray image.

12. The method of claim 1, wherein a number of the one or more 2D convolutional layers whose parameters are fixed during the training of the second convolutional neural network is determined based on a usage of a memory included in a device for training the neural network.

13. A non-transitory computer-readable recording medium comprising computer executable instructions, when executed, configured to cause a processor to perform a method of training a neural network with three-dimensional (3D) training image data comprising a plurality of two-dimensional (2D) training image data, the method comprising:

training, at the processor, a first convolutional neural network with first patch image data included in each of the plurality of 2D training image data, wherein the first convolutional neural network comprises a plurality of 2D convolutional layers, the 2D convolutional layers comprise first convolutional layers and second convolutional layers configured to receive an output of the first convolutional layers as an input, and the plurality of 2D training image data are included in the 3D training image data;

training, at the processor, the first convolutional neural network with all of the plurality of 2D training image data, wherein parameters of the first convolutional layers are fixed according to a result of training the first convolutional neural network with the first patch image data; and training, at the processor, a second convolutional neural network with the 3D training image data, wherein the second convolutional neural network comprises the 2D convolutional layers, and one or more 3D convolutional layers following an output of the 2D convolutional layers as an input, wherein at least one of the training the first convolutional neural network or the training the second convolutional neural network comprises training the first convolutional neural network with the plurality of 2D training image data and additional 2D training image data of a different domain from the plurality of 2D training image data, wherein the 3D training image data comprises at least one of a digital breast tomosynthesis (DBT) image or a computed tomography (CT) image, and the additional 2D training image data comprises at least one of a full-field digital mammography (FFDM) image or an X-ray image, and wherein parameters of one or more 2D convolutional layers among the 2D convolutional layers are fixed during the training of the second convolutional neural network, and parameters of one or more other 2D convolution layers among the 2D convolutional layers are trained with the 3D training image data during the training of the second convolutional neural network.

14. The recording medium of claim 13, wherein parameters of the one or more 3D convolutional layers are trained with the 3D training image data during the training of the second convolutional neural network.

15. The recording medium of claim 13, wherein a number of the one or more 2D convolutional layers whose parameters are fixed during the training of the second convolutional neural network is determined based on a usage of a memory used by the processor.

16. A device for training a neural network comprising:

a memory configured to store computer-executable instructions; and a processor configured to execute the computer-executable instructions to:

train a first convolutional neural network with a plurality of 2D training image data, wherein the first convolutional neural network comprises 2D convolutional layers, and the plurality of 2D training image data are included in 3D training image data; and train a second convolutional neural network with the 3D training image data, wherein the second convolutional neural network comprises the 2D convolutional layers, and one or more 3D convolutional layers following an output of the 2D convolutional layers as an input, wherein at least one of the training the first convolutional neural network or the training the second convolutional neural network comprises, training the first convolutional neural network with the plurality of 2D training image data and additional 2D training image data of a different domain from the plurality of 2D training image data, wherein the 3D training image data comprises at least one of a digital breast tomosynthesis (DBT) image or a computed tomography (CT) image, and the additional 2D training image data comprises at least one of a full-field digital mammography (FFDM) image or an X-ray image, and wherein parameters of one or more 2D convolutional layers among the 2D convolutional layers are fixed during the training of the second convolutional neural network, and parameters of one or more other 2D convolution layers among the 2D convolutional layers are trained with the 3D training image data during the training of the second convolutional neural network.

17. The device of claim 16, wherein each of the plurality of 2D training image data comprises first patch image data, wherein the 2D convolutional layers comprise first convolutional layers and second convolutional layers configured to receive an output of the first convolutional layers as an input, and wherein in training the first convolutional neural network, the processor is configured to:

train the first convolutional neural network with the first patch image data; and train the first convolutional neural network with all of the plurality of 2D training image data, while fixing parameters of the first convolutional layers according to a result of training the first convolutional neural network with the first patch image data.

18. The device of claim 16, wherein parameters of the one or more 3D convolutional layers are trained with the 3D training image data during the training of the second convolutional neural network.

19. The device of claim 16, wherein a number of the one or more 2D convolutional layers whose parameters are fixed during the training of the second convolutional neural network is determined based on a usage of the memory.

* * * * *